July 3, 1956 H. E. SCHRADER 2,752,840
WEEDERS
Filed July 16, 1954
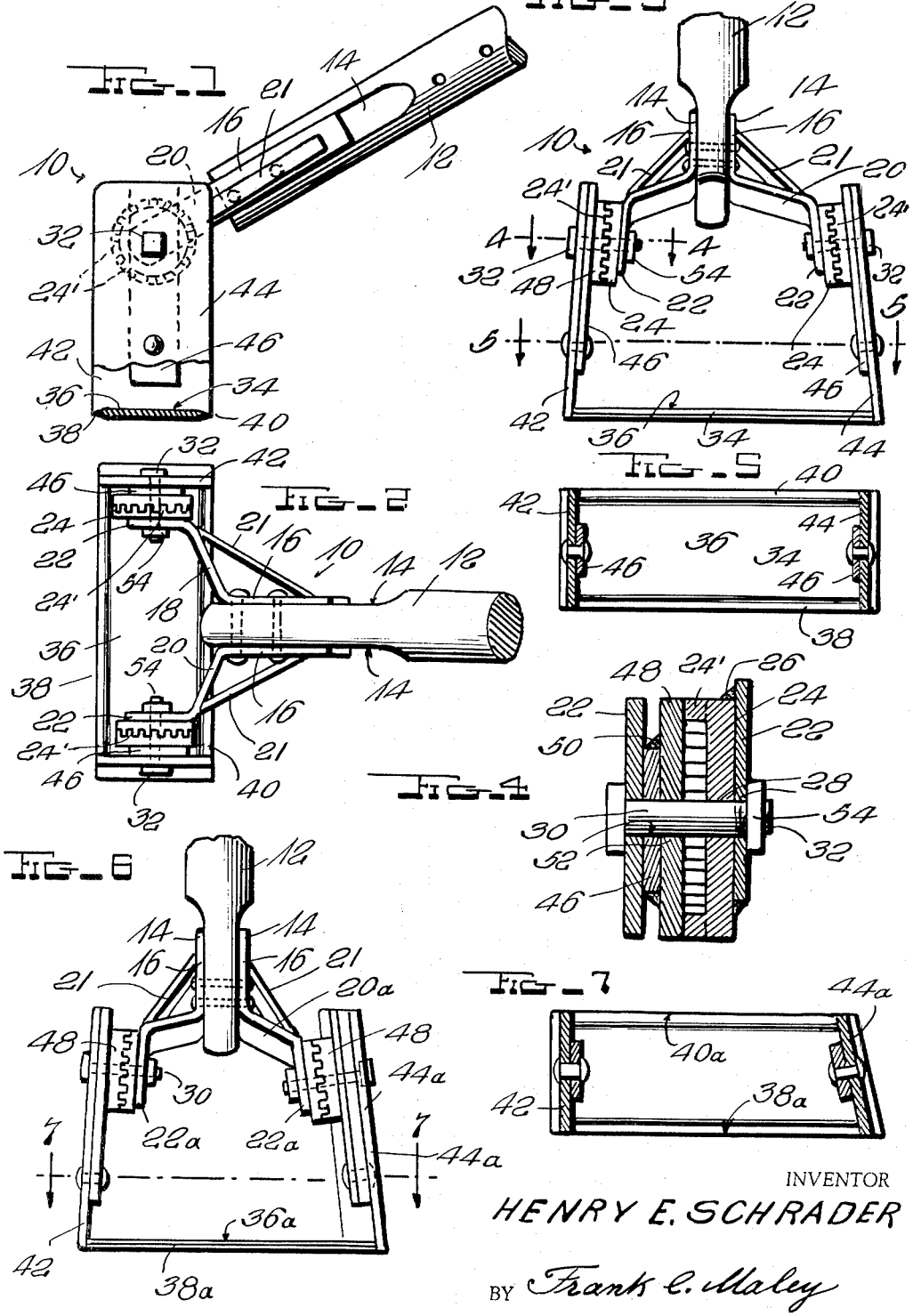
INVENTOR
HENRY E. SCHRADER
BY Frank C. Maley
AGENT United States Patent Office 2,752,840
Patented July 3, 1956

2,752,840

WEEDERS

Henry E. Schrader, Pembine, Wis.

Application July 16, 1954, Serial No. 443,837

1 Claim. (Cl. 97—69)

This invention pertains to improvements in farming and gardening implements and particularly relates to an improved weeder for use in removing weeds from the soil, in tilling and ancillary soil cultivating tasks.

The primary object of this invention is to provide a novel form of blade construction whereby weeds can be more easily and quickly removed from the soil with less manual exertion.

Another object of this invention is to provide means for connecting the blade to a handle or supporting shank in a manner so that the angle of attack of the blade can be quickly and easily changed and the angular relationship of the blade and the handle can be adjusted to position the handle at various heights for convenient use by users of differing heights.

A further object of this invention resides in the construction of the blade so that the weeds, dirt, etc. hoed from the soil will be deposited to the side of the row being worked as the blade is pulled along the row.

A still further object of this invention is to provide a simple, compact and inexpensively but sturdily constructed weeder which can be comfortably and efficiently used by people of different heights.

These and ancillary objects are attained by this invention, the preferred forms of which are set forth in the following description and illustrated in the accompanying drawing, wherein:

Fig. 1 is a side elevational view, partly in section, of the weeder;

Fig. 2 is a top plan view thereof;

Fig. 3 is a front elevational view thereof;

Fig. 4 is a detailed cross-sectional view taken on line 4—4 of Fig. 3 and showing the adjustable connecting means in detail;

Fig. 5 is a cross-sectional view taken on line 5—5 of Fig. 3;

Fig. 6 is a front elevational view of a modified form of blade structure, and,

Fig. 7 is a cross-sectional view taken on line 7—7 of Fig. 6.

Referring now more particularly to the drawing, the weeder 10 includes a handle 12 which, while primarily intended to be manually manipulated, may constitute a supporting shank adapted to be attached to a power vehicle. The handle has opposed flattened sides 14 on its lower end and the flat ends 16 of the sections 18 and 20 of a yoke are fixedly superimposed thereon by any suitable securing means and are provided with diagonal reinforcing bars 21.

The outer, spaced apart ends 22 of the yoke sections project forwardly of the end of the handle and have gears 24 fixed by welding 26 or the like to their outer sides, as shown in detail in Fig. 4. The gears 24 fit flat at their inner faces against the sides of the ends 22 and have outer faces formed with a plurality of teeth 24'. The teeth 24' are grouped on the outer faces around the outer peripheries thereof and are formed radially on the faces. The ends 22 and the gears are formed with aligned openings 28 which are adapted to receive the shank 30 of fastening bolts 32.

The blade 34 is substantially U-shaped and includes a flat plate 36 which has sharpened leading or front and trailing or rear edges, 38 and 40, respectively. Upstanding legs 42 and 44 are formed integral with the plate at the ends thereof and are vertically convergent. The legs are inclined inwardly at less than a 90° angle to the plate and have reinforcing plates 46 rivetted to their inner faces. Gears 48, identical to the gears 24 are welded, as at 50, to the inner faces of the plates 46 and are adapted to mesh with the gears 24. The legs, plates and gears 48 are formed with registering openings 52 to receive the shanks of the bolt which has its head bearing against the outside of the legs and is provided with a locking nut 54 that bears against the inside of the ends 22.

It can be seen that the bolts hold the gears 24 and 48 in meshed facial engagement so that the handle is securely locked in a set angular relationship to the blade. To adjust the angle, the bolts are loosened to permit the legs 42 and 44, which are inherently resilient, to be flexed apart and move the teeth of the gears 48 out of engagement with the teeth of the gears 24 so that the handle can be moved to another angular position relative to the blade.

In the modified form of Figs. 6 and 7, the leg 44a is angled rearwardly to the rear edge 40a of the plate 36a. The leg 44a and the adjoining end 22a of the yoke section 20a are parallel so as not to interfere with the flat facial contact of the gears. The rearward, inward horizontal inclination of the leg 44a produces a trailing edge 40a on the plate which is narrower than the leading edge 38a. Thus, as the blade is pulled along the ground and the leading edge 38a digs out the weeds and the weeds and dirt pass over the top of the plate 36a, the material will be deflected by the leg 44a and deposited to the side of the row or garden edge being worked. The rearward horizontal inclination of the leg 44a taken together with the substantially vertical arrangement of the leg provides a device which operates similar to a mold board to deflect the soil and weeds to the side of the row. The row or edge will thus be kept clean and the material will be prevented from falling back into the row or edge and instead will be deposited alongside the row or edge. The weeder of Figs. 6 and 7 is in all other respects identical to that of Figs. 1–5.

While the best known forms of this invention have been shown and described, other forms may be realized as come within the scope of the invention defined in the appended claim.

I claim:

A weeder comprising a handle having a yoke attached to one end thereof, said yoke having slightly outwardly divergent ends which project outwardly from the handle, gears fixedly superimposed on the outer faces of said ends and having outer faces formed with radial teeth, a substantially U-shaped blade having a flat bight portion arranged transverse to the handle and disposed in spaced relation to the one end thereof and formed with sharpened leading and trailing side edges and having a first and a second leg integral with the ends thereof and extending toward the handle, said legs being flat and being inclined inwardly from the bight portion relative to each other at an obtuse angle of slightly less than 90° and having free ends provided on their inner faces with radial teeth meshing with the teeth on the gears on the yoke ends, said yoke ends, gears and ends of the legs having registering apertures, bolt means disposed through the apertures to hold the gears and teeth in locking engagement and said second leg being bodily inclined inwardly relative to the trailing edge of the bight portion to provide a vertical, rearwardly inclined surface for depositing soil to the side of the row being cut by said weeder.

References Cited in the file of this patent

UNITED STATES PATENTS

| | | |
|---|---|---|
| 790,760 | Stuart | May 23, 1905 |
| 1,334,586 | Baker | Mar. 23, 1920 |
| 1,663,716 | McMillan | Mar. 27, 1928 |
| 1,848,651 | Peeler et al. | Mar. 8, 1932 |

FOREIGN PATENTS

| | | |
|---|---|---|
| 508,831 | Germany | Oct. 2, 1930 |